March 27, 1951  B. J. PROCHAZKA  2,546,404
VEHICLE SIGNAL LIGHT

Filed Sept. 28, 1949  2 Sheets-Sheet 1

INVENTOR.
Bretislav J. Prochazka
BY Albert G. McCaleb
Att'y

March 27, 1951     B. J. PROCHAZKA     2,546,404
VEHICLE SIGNAL LIGHT
Filed Sept. 28, 1949     2 Sheets-Sheet 2
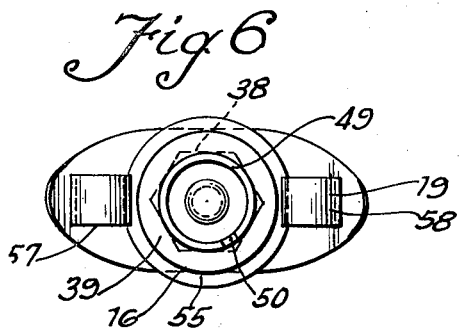
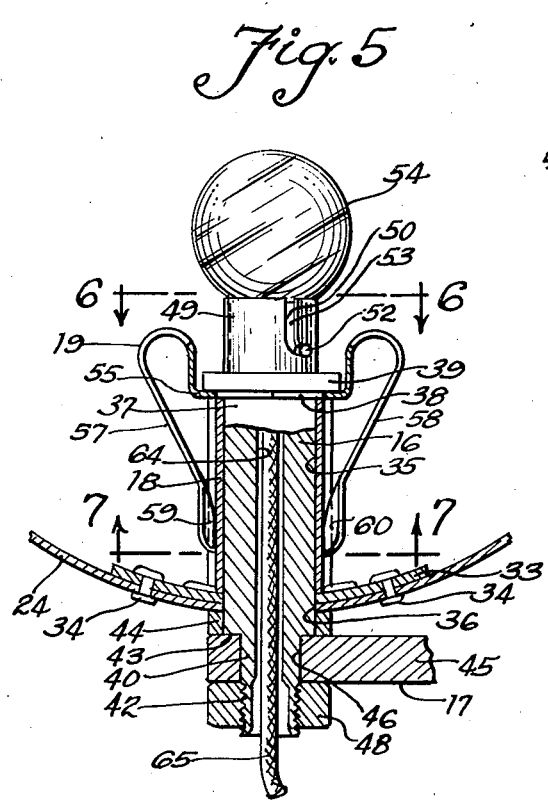
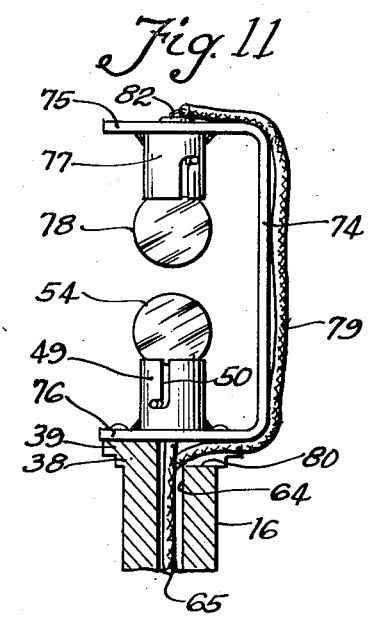
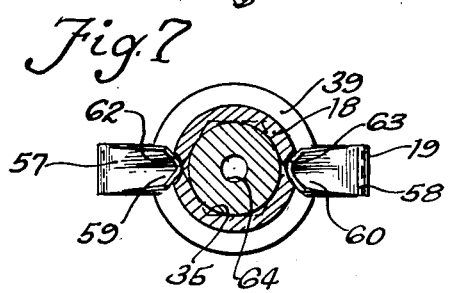
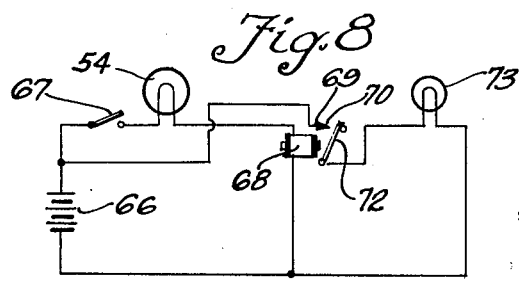
INVENTOR.
Bretislav J. Prochazka
BY Albert G. McCaleb
Atty Patented Mar. 27, 1951

2,546,404

UNITED STATES PATENT OFFICE 2,546,404

VEHICLE SIGNAL LIGHT

Bretislav J. Prochazka, Jackson Heights, N. Y.

Application September 28, 1949, Serial No. 118,437

6 Claims. (Cl. 177—329)

This invention relates to signal lights for use on vehicles, and more particularly to such signal lights which are adapted readily to be turned to predetermined positions and normally to retain such positions when turned thereto.

It is often the case in localities that certain local authorities, such as the mayor, city manager, deputies, justices of the peace, coroner and others, such as doctors, red cross workers and the like, use their own cars for official duties in some cases and are permitted some privileges or special considerations in committing certain traffic violations in emergency cases. One of the exemplary uses of the disclosed light is to provide a readily recognizable identification for the vehicles of such officials or other persons, to be placed upon their vehicles and used only in the event of a circumstance giving rise to the requirements.

It is contemplated that such signal light, in order to distinguish it from a spot light, or the signal light of a police car, fire truck or the like may carry a lens of a distinctive color, and even an emblem on the lens which will indicate the official or type of person to whom it may belong. Further than this, and as a feature more closely related to the structure and operation of the light unit, it is considered advisable to provide a light and mounting structure which are not only adapted to mounting in a conspicuous position on the vehicle, but which permits the light readily to be turned to one of a plurality of predetermined positions and normally to hold such positions when turned thereto. Thus, when the vehicle is not being used for an official or emergency purpose, the light unit will not only be turned off, but will be turned to an inconspicuous position. When it is needed, it will be turned to a conspicuous position and turned on.

Having in mind uses and structure such as those designated, it is one of the objects of my invention to provide a signal light unit for vehicles which includes a mounting bracket and a light housing which are relatively rotatable to predetermined positions and which have associated elements for releasably holding the light housing in the predetermined positions relative to the mounting bracket when turned thereto.

As a correlated object, my invention comprehends the provision of a signal light having the designated characteristics and which is so constructed and arranged that the turning of the light housing relative to the mounting bracket does not twist or bend the lead wire or wires extending to a bulb by which the light is illuminated.

It is further within the purview of my invention to provide a vehicle signal of the character described and which embodies two bulbs adapted to selective or simultaneous use in order to adapt the light to either changes of color or different degrees of brilliance.

In adapting my vehicle signal light to commercial form, it has further been a purpose of my invention to provide a structure for a light unit which, in addition to fulfilling the aforementioned purposes, is adapted to economy in production and ruggedness in service.

Other objects and advantages of the invention will be apparent from the following description and the accompanying drawings in which similar characters of reference indicate similar parts throughout the several views.

Referring to the two sheets of drawings;

Fig. 5 is a fragmentary front sectional view showing details of the internal structure of a portion of the signal light shown in Fig. 1;

Fig. 6 is a top plan view of a portion of the signal lamp structure illustrated in Fig. 5, and wherein the view is taken substantially as shown by a line 6—6 and accompanying arrows in Fig. 5;

Fig. 7 is a sectional view wherein the section is taken substantially as indicated by a line 7—7 and accompanying arrows in Fig. 5;

Fig. 8 is a schematic circuit diagram illustrating one manner of making electrical operating connection to my disclosed signal light, so as to provide a telltale indication at the position separated from the light;

Fig. 11 illustrates a modified portion of the structure adapting my signal light to the use of two light bulbs.

Figure 1:
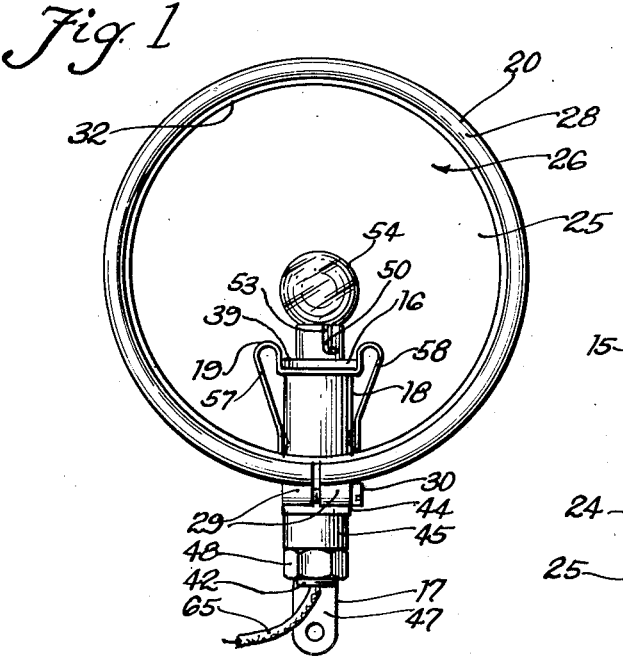
Fig. 1 is a front elevational view of a signal light adapted to use on vehicles and the like, and embodying a preferred form of my invention.
Figure 2:
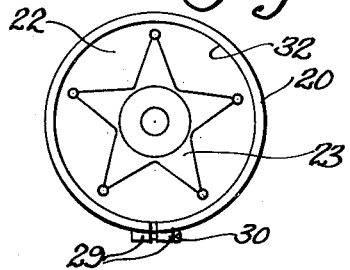
Fig. 2 is a front elevational view of a bezel adapted to the use on the light shown in Fig. 1 and illustrating its adaptation to the carrying of an indicia-bearing lens.
Figure 3:
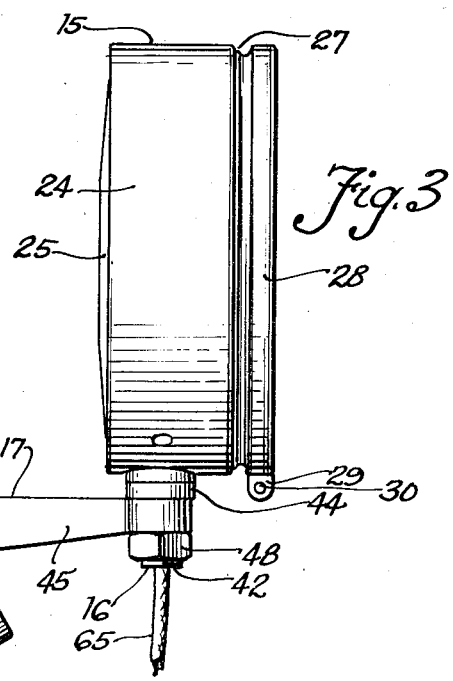
Figs. 3 and 4 are respectively side elevational and top plan views of the signal light shown in Fig. 1.
Figure 9:
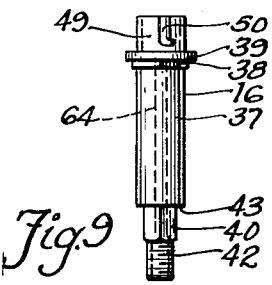
Figs. 9 and 10 are respectively front and top end elevational views of parts of the light structure illustrated in Figs. 1, 5 and 6.

Considered generally, the exemplary form of my signal light unit which is shown in the accompanying drawings for illustrative purposes includes a light housing 15 of generally cylindrical shape and which is supported for rotational movement relative to a spindle 16 which is secured to a mounting bracket 17 and extends radially into a bearing sleeve 18 which is carried within the housing. In the disclosed form of my signal light, structure including a formed leaf-type spring 19 is adapted to hold the light housing in predetermined positions relative to the mounting bracket. As depicted in Fig. 2, a bezel 20 is adapted to fit the open front of the light housing 15 and may, in instances such as those which have been outlined, carry a lens 22, which lens has thereon an indicium 23, such as the depicted star, to provide a designation of the person or authority of the operator of the car. With this structural arrangement, the signal light is turned to a conspicuous and readily ascertainable position while the car is in use for emergency or official purposes. At other times, the signal light is turned, so that the lens is hidden or obscured, and the holding structure referred to releasably retains the signal light in the position to which it has been turned.

Referring in greater detail to the disclosed structure, the light housing 15 has a substantially cylindrical side wall 24 with a circular back wall 25 secured thereto to provide a closure having an open front 26; the side wall having a formed edge 27 adjacent the front opening for carrying a bezel 28. In the disclosed structure, the bezel 28 is split on one side and has lugs 29 thereon which receive a clamping screw 30 by which the bezel is secured in place relative to the formed edge portion 27 of the housing. A snap ring 32 is utilized for holding the lens 22 firmly and tightly in place relative to the mounted bezel, and so as to cover the open front of the housing.

The bearing sleeve 18, in my disclosed structure, has an end flange 33 thereon which is formed to fit the interior of the housing side wall 24. By this flange, the bearing sleeve is secured within the housing by fastening means, such as rivets 34, so that the axis of a bearing bore 35 within the sleeve extends radially into the housing. Also, the housing side wall 24 has an opening 36 therein which is of substantially the same size as the bearing bore 35 and is aligned therewith.

The spindle 16 has a bearing portion 37 adapted to fit rotatably into the bearing bore 35 of the sleeve 18 and of a length to extend through the bearing bore and the opening 36 in the housing side wall. At one end of the bearing portion 37, the spindle has integrally formed thereon a polygonal shank 38 which, in the present instance, is hexagonal. Adjacent the shank 38, and also integrally formed on the spindle 16 is a collar 39 of a diameter larger than that of the bearing portion 37. At the end opposite the collar 39, the spindle 16 is provided with a portion 40 which is coaxial to the bearing portion 37 and includes a threaded end portion 42; the diameter of the portion 40 being less than that of the bearing portion, so that those portions are separated by a substantially radial shoulder 43. In the assembly, as depicted in Fig. 5, the bearing portion 37 of the spindle 16 fits into the bearing bore 35 of the sleeve 18 with the polygonal shank 38 adjacent the end of the sleeve within the housing 15. The bearing portion 37 of the spindle extends through the bearing bore of the sleeve, through the opening 36 in the housing side wall, and through a washer 44 on the exterior of the housing side wall, with the portions 40 and 42 thereof projecting outwardly of the housing.

Although the mounting bracket for the disclosed signal light may take various forms, depending upon the position and manner of mounting on a vehicle, the disclosed mounting bracket 17 includes an arm 45 having a bore 46 at one end thereof which fits onto the portion 40 of the spindle, and an end portion 47 which is adapted suitably to be secured to a desired portion of a vehicle. In the structure referred to, fastening means, such as a nut 48, threaded on to the threaded end portion 42 of the spindle secures the mounting bracket to the spindle to support the light unit. It may be readily understood that with the disclosed structure, the arm 45 of the mounting bracket is gripped between the shoulder 43 of the spindle and the nut 48, so that the spindle is stationary relative to the mounting bracket, while the light housing is rotatable on the bearing portion 37 of the spindle and relative to the spindle and mounting bracket.

A lamp socket 49 is mounted on the end of the spindle 16 adjacent the collar 39 and, in the present instance, has a conventional hook slot 50 therein for receiving a prong 52 on a base portion 53 of a conventional lamp bulb 54. In the form of my invention illustrated in Figs. 1 to 7 inclusive, the lengths of the spindle and bearing sleeve are such that the lamp bulb 54 is disposed substantially at the mid-portion of the housing.

Figure 4:
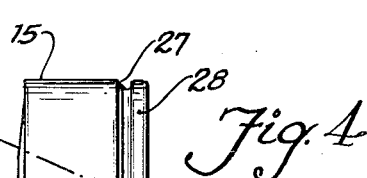
Figure 10:
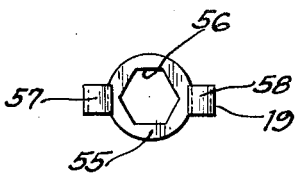

In order releasably to hold the light housing 15 in selected and predetermined positions to which it is rotated relative to the spindle 16, I have provided the leaf-spring 19 which includes a substantially flat mid-portion 55 having a polygonal opening 56 therein which fits onto the polygonal shank 38 of the spindle, thereby to hold the spring in a fixed position peripherally of the spindle and between the end of the bearing sleeve 19 and the collar 39 on the spindle. This spring also has curved side arms 57 and 58 in opposed relationship, with end portions 59 and 60 biased by the resilience of the arms into engagement with the external surface of the bearing sleeve 18 at a position below the spindle collar 39. At selected and predetermined positions, the exterior of the bearing sleeve is provided with longitudinally extending grooves 62 and 63 in opposed relationship and into which the end portions 59 and 60 of the arms 57 and 58 snap when the housing is in a predetermined position relative to the spindle. The arms 57 and 58 of the spring thus retain the housing at the selected positions which are predetermined by the location of the grooves 62 and 63 in the periphery of the bearing sleeve. The biasing force of the arms is sufficient to hold the housing in one of the predetermined positions to which it is turned, while merely offering resistance to manual turning effort applied to the light housing. In Fig. 4, the rotation of the light housing relative to the bracket 17, is illustrated in dot and dash lines at 15a.

An axial bore 64, through the spindle 16, provides a stationary conduit through which an electrical lead wire 65 extends to furnish power from a battery at a position external to the signal light to one contact of the socket 49; the other connection to the lamp being provided in the customary manner by grounding the other contact to the socket. By utilizing the spindle 16 as a lead carrying element, the lead wire remains stationary regardless of the rotational movement of the light housing, so that there is no possibility of the lead wire being twisted off.

In the exemplary electrical circuit which is shown in Fig. 8, the lamp bulb 54 of the signal light is connected to one side of a battery 66 through a manually operable switch 67; the other side of the battery being connected to the lamp bulb through an electromagnet winding 68 of a relay 69, so that the winding of the relay, having normally open contacts 70 and 72, is connected in series with the signal light bulb, thereby to become energized when the signal light bulb is turned on. The resultant closing of the normally open relay contacts closes a second circuit from the battery 66 to a telltale lamp bulb 73 which may be located on the dash board, or on some other easily observed position in a vehicle, to provide an indication that the signal light is in operation. If the lamp bulb 54 in the signal light should burn out, or would not light for any reason, the telltale lamp bulb would not light because the relay electromagnet is not energized unless the signal light bulb is lit.

In the modified form of my invention which is depicted in Fig. 11, I have illustrated the adaptation of my signal light to the use of two lamp bulbs which may either be of different colors for use on different occasions, or one of which may be connected in series with a flasher to provide an indication by the variations of the brilliance of the illumination emanating from the signal light. Parts bearing reference numerals similar to those formerly described are substantially like those which have been referred to and serve similar purposes. In this modified structure, however, a bracket 74 has end portions 75 and 76 in opposed and spaced relationship. The end portion 76 thereof is secured to the end of the spindle 16 adjacent the collar 39; the lamp 54 being mounted on that same end of the spindle, as before. An additional socket 77 is mounted on the end portion 75 of the bracket in opposed relationship to the socket 49 and carries a second light bulb 78. While the lead wire 65 carries the operating current to the socket 49, a second lead wire 79 extends through the opening 64 in the spindle, and out through a cross bore 80 at a position such that it extends along the bracket 74 to a contact 82 of the socket 77.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A signal lamp for use on vehicles and comprising, in combination, a lamp housing of generally cylindrical shape and having side and back walls and a front opening, a bearing sleeve flanged at one end to fit the interior of the housing and having a bearing bore therethrough, the side wall of said housing having an opening therein substantially corresponding in size to that of the bearing bore, means securing the flange of the bearing sleeve to the interior of the housing so that the axis of the bearing bore is substantially radial to the housing and the bearing bore is aligned with the opening in the housing side wall, a unitary spindle having a collar at one end which has a diameter larger than that of the bearing bore, an intermediate bearing portion of a diameter and length to fit and extend through the bearing bore, and a partially threaded portion at the other end which has a diameter smaller than the bearing bore and is separated from the intermediate bearing portion by a shoulder, said spindle fitting into the bearing sleeve with the collar adjacent the end of the sleeve within the housing, a lamp socket on the collar end of the spindle, a mounting bracket secured to the partially threaded end portion of the spindle between said shoulder and a nut threaded onto the partially threaded portion, whereby said housing and bearing sleeve are rotatable relative to the spindle and mounting bracket, said spindle having a wire receiving bore extending axially therethrough to the lamp socket, the outer surface of the bearing sleeve having grooves therein at circumferentially spaced positions, and leaf spring elements fixedly mounted on the spindle and having end portions at positions for releasable engagement with said grooves in the bearing sleeve to hold the housing at predetermined positions relative to the mounting bracket.

2. A signal lamp for use on vehicles and comprising, in combination, a lamp housing having a side wall and a front lens opening, a bearing sleeve secured to the side wall and extending into said housing, said bearing sleeve and the housing side wall having aligned bearing bores therethrough, a spindle having a bearing surface rotatably fitting into the bearing bore of said sleeve, said spindle having a polygonal shank at one end and a collar adjacent the shank and of a diameter larger than that of said bearing surface, said collar and shank, in the assembled relationship of the spindle with the bearing sleeve, being adjacent the end of the sleeve within the housing, a lamp socket on the collar end of the spindle, said spindle also having a threaded end portion projecting axially from the end thereof opposite the collar and of a diameter smaller than that of the bearing surface, a mounting bracket secured to the threaded end portion of the spindle externally of the housing, a leaf spring element non-rotatably mounted on the polygonal shank of the spindle and having an arm extending into resiliently biased engagement with the exterior of the bearing sleeve, and means on the external surface of the bearing sleeve for releasably retaining the arm and bearing sleeve at predetermined relative positions, so as to hold the housing at predetermined positions relative to the spindle.

3. A signal lamp as defined in claim 2, and further characterized by a bracket secured to the collar end of said spindle and extending around the lamp socket with a portion axially aligned with and spaced from the collar end of the spindle, and a second lamp socket mounted on said portion of the bracket in opposed relationship to the first mentioned socket.

4. In a signal light for use on vehicles, the combination comprising a spindle part having a bearing surface thereon, a mounting bracket secured to one end portion of the spindle part, a light housing having a bearing part therein for receiving the spindle part so as to support the housing for rotation relative to the spindle part and bracket, and a resiliently biased element on the spindle part and urged into engagement with the bearing part, and notches in said bearing part aligned for engagement by said element to hold the light housing in predetermined positions relative to the mounting bracket.

5. In a signal light as defined in claim 4, the combination being further characterized by a second bracket secured to the spindle part, and lamp sockets mounted on the spindle part and second bracket in opposed relationship.

6. In a signal light as defined in claim 5, said housing having a front opening, and a bezel adapted to fit said front opening and adapted to carry a lens having an indicium thereon.

BRETISLAV J. PROCHAZKA.

REFERENCES CITED

The following references are of record in the file of this patent:

UNITED STATES PATENTS

| Number | Name | Date |
|---|---|---|
| 1,242,516 | Britton | Oct. 9, 1917 |
| 1,486,410 | Bagnall | Mar. 11, 1924 |
| 1,632,081 | Jones | June 14, 1927 |
| 2,289,482 | Carlson | July 14, 1942 |